(12) United States Patent
Breau et al.

(10) Patent No.: US 6,530,110 B1
(45) Date of Patent: Mar. 11, 2003

(54) MIRROR CLEANING SYSTEM

(76) Inventors: Tony Breau, 105-110th Ave., Treasure Island, FL (US) 33706; Michael Accommando, 1190 20th St. North, St. Petersburg, FL (US) 33713

( * ) Notice: Subject to any disclaimer, the term of this patent is extended or adjusted under 35 U.S.C. 154(b) by 0 days.

(21) Appl. No.: 09/883,806

(22) Filed: Jun. 18, 2001

(51) Int. Cl.[7] .............................. B60S 1/56; B60S 1/46
(52) U.S. Cl. ........................ 15/250.003; 15/250.29; 15/250.04
(58) Field of Search .............. 15/250.003, 250.002, 15/250.04, 250.29, 250.24, 250.12

(56) References Cited

U.S. PATENT DOCUMENTS

| | | | | |
|---|---|---|---|---|
| 3,378,875 A | * | 4/1968 | Kern | 15/250.04 |
| 3,526,920 A | * | 9/1970 | Boyanich, Sr. | 15/250.003 |
| 5,179,758 A | * | 1/1993 | Smith et al. | 15/250.003 |
| 5,522,112 A | * | 6/1996 | Tiffany, III | 15/250.01 |
| D419,950 S | * | 2/2000 | Spector | D12/219 |

FOREIGN PATENT DOCUMENTS

| | | | | |
|---|---|---|---|---|
| DE | 4213506 | * | 10/1993 | 15/250.003 |
| EP | 47344 | * | 3/1982 | 15/250.04 |

* cited by examiner

*Primary Examiner*—Gary K. Graham

(57) ABSTRACT

A mirror cleaning system has a mirror with a mirror support assembly, a drive assembly including a drive shaft to effect rotation, a motor, a hollow cross piece including a supported wiper arm and at least one aperture spaced along the length thereof, and a length of hollow flexible tubing adapted to be coupled to the cross piece and a source of pressurized cleaning fluid.

1 Claim, 3 Drawing Sheets

MIRROR CLEANING SYSTEM

BACKGROUND OF THE INVENTION

1. Field of the Invention

The present invention relates to a mirror cleaning system and more particularly pertains to cleaning and wiping mirrors of trucks and like vehicles in a superior fashion.

2. Description of the Prior Art

The use of mirror cleaning systems of known designs is known in the prior art. More specifically, mirror cleaning systems of known designs previously devised and utilized for the purpose of cleaning mirrors of trucks and like vehicles are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 6,161,247 to Breau et al discloses a mirror cleaning system. U.S. Pat. No. 5,410,774 to Adams discloses a portable window wiper. U.S. Pat. No. 5,362,119 to Rosentratter discloses a glare shield for a truck. U.S. Pat. No. 5,179,758 to Smith et al. discloses a wiper attachment for the rear view window of a truck, bus or similar vehicle. U.S. Pat. No. 5,150,497 to Preik disclos a truck mirror wiper. U.S. Pat. No. 4,763,381 o Williams discloses an accessory to keep outside rear view mirrors clear of water, snow, ice and dirt. U.S. Pat. No. 4,527,301 to Weitz discloses a side view mirror truck windshield wiper. U.S. Pat. No. 4,306,328 to Layton discloses a wiper apparatus for a side view mirror of a truck or the like. Lastly, U.S. Pat. No. 3,968,537 to Wagenhofer discloses a motorized wiping blade device for truck rear view mirrors.

While these devices fulfill their respective, particular objectives and requirements, the aforementioned patents do not describe a mirror cleaning system that allows cleaning and wiping mirrors of trucks and like vehicles in a superior fashion.

In this respect, the mirror cleaning system according to the present invention substantially departs from the conventional concepts and designs of the prior art, and in doing so provides an apparatus primarily developed for the purpose of cleaning and wiping mirrors of trucks and like vehicles in a superior fashion.

Therefore, it can be appreciated that there exists a continuing need for a new and improved mirror cleaning system which can be used for cleaning and wiping mirrors of trucks and like vehicles in a superior fashion. In this regard, the present invention substantially fulfills this need.

SUMMARY OF THE INVENTION

In view of the foregoing disadvantages inherent in the known types of mirror cleaning systems of known designs now present in the prior art, the present invention provides an improved mirror cleaning system. As such, the general purpose of the present invention, which will be described subsequently in greater detail, is to provide a new and improved mirror cleaning system and method which has all the advantages of the prior art and none of the disadvantages.

To attain this, the present invention essentially comprises a mirror cleaning system 10 comprised of a plurality of components. Such components in their broadest context include a mirror, a drive assembly, a motor, a hollow cross piece, and length of hollow flexible tubing. Such components are individually configured and correlated with respect to each other so as to attain the desired objective.

A mirror is first provided. The mirror has an exposed front surface with a long vertically extending interior side edge and a parallel exterior side edge. The mirror also has a short horizontally extending top edge and a short horizontally extending bottom edge. Next provided is a mirror support assembly. The mirror support assembly has a horizontally extending top plate with an aperture formed therein. The mirror support assembly also has a parallel bottom plate. A back plate is coupled to the top plate and bottom plate to form an enclosure. The top and bottom plates support the mirror. A first side plate and a second side plate are provided. Brackets are secured to the support assembly for coupling to a vehicle. Further provided are a pair of drive assemblies positioned on each side of the mirror within the support assembly. Each drive assembly has an upper pulley fixedly positioned in proximity with the top plate of the support assembly and a lower pulley fixedly positioned in proximity with the bottom plate of the support assembly. Each upper drive pulley is operatively coupled with an associated lower pulley with one of a pair of toothed belts spanning the associated pulley. A drive shaft is next provided. The drive shaft couples the top pulleys of each drive assembly to effect concurrent rotation. Further provided is a speed reducer. The speed reducer is supported adjacent one of the upper drive pulleys and coupled to the shaft adjacent one of the drive pulleys. An electric motor is provided. The electric motor is supported upon the back plate beneath the speed reducer and adapted to be coupled by a wire to a source of electricity. Next provided is a pair of cam lobes. The cam lobes are coupled to the shaft for rotation therewith and located adjacent the speed reducer. Further provided is a pair of limit switches. The limit switches are mounted to the back plate adjacent the cam lobes for periodic contact therewith as caused by the rotation of the cam lobes. The limit switches function to control the length and direction of travel of the cross piece. A hollow cross piece is provided. The hollow cross piece has an open end block and a closed end block. The end blocks are each adapted to receive and ride upon one of the toothed belts. The cross piece has an axial recess facing the mirror. The cross piece includes a supported double bladed elongated wiper arm of an elastomeric material. The wiper arm is in sliding contact with the front surface of the mirror for cleaning purposes during reciprocation of the cross piece. The wiper arm is supported along its length by the recess. The cross piece has a pair of apertures spaced along the length thereof for spraying a cleaning fluid onto the surface of the mirror. Finally, a length of hollow flexible tubing is provided. The flexible tubing has a first end adapted to be coupled to a source of pressurized cleaning fluid exterior of the mirror support assembly. The tubing has an intermediate extent passing through the aperture in the top plate of the mirror assembly and formed in a loop within the first side plate of the support assembly. The tubing has a second end coupled to the open end block of the cross piece adapted to deliver a supply of cleaning fluid to and through the cross piece onto the mirror.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved mirror cleaning system which has all of the advantages of the prior art mirror cleaning systems of known designs and none of the disadvantages.

It is another object of the present invention to provide a new and improved mirror cleaning system which may be easily and efficiently manufactured and marketed.

It is further object of the present invention to provide a new and improved mirror cleaning system which is of durable and reliable constructions.

An even further object of the present invention is to provide a new and improved mirror cleaning system which is susceptible of a low cost of manufacture with regard to both materials and labor, and which accordingly is then susceptible of low prices of sale to the consuming public, thereby making such mirror cleaning system economically available to the buying public.

Even still another object of the present invention is to provide a mirror cleaning system for cleaning and wiping mirrors of trucks and like vehicles in a superior fashion.

Lastly, it is an object of the present invention to provide a new and improved mirror cleaning system having a mirror with a mirror support assembly, a drive assembly including a drive shaft to effect rotation, a motor, a hollow cross piece including a supported wiper arm and at least one aperture spaced along the length thereof, and a length of hollow flexible tubing adapted to be coupled to the cross piece and a source of pressurized cleaning fluid.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
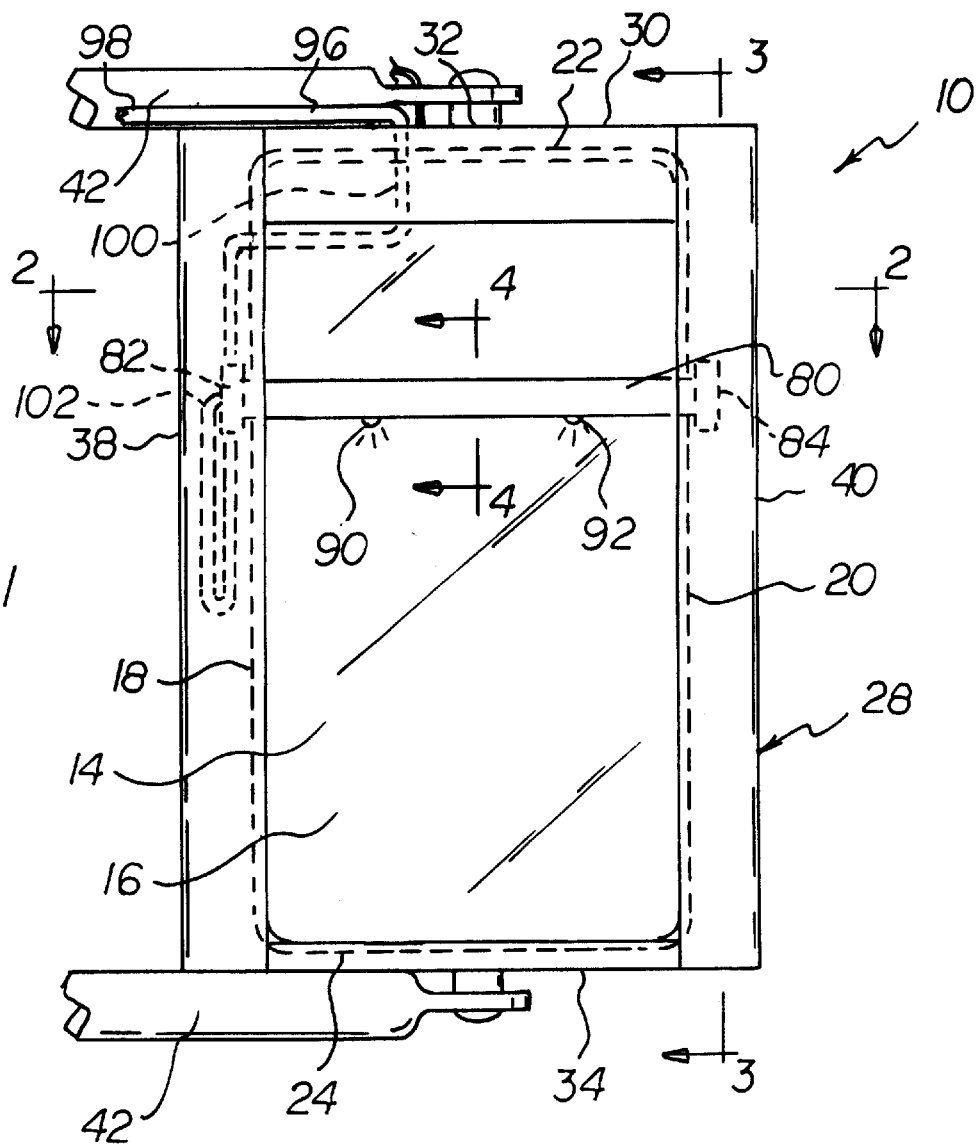
FIG. 1 is a front elevational view of the mirror cleaning system constructed in accordance with the principles of the present invention.
Figure 2:
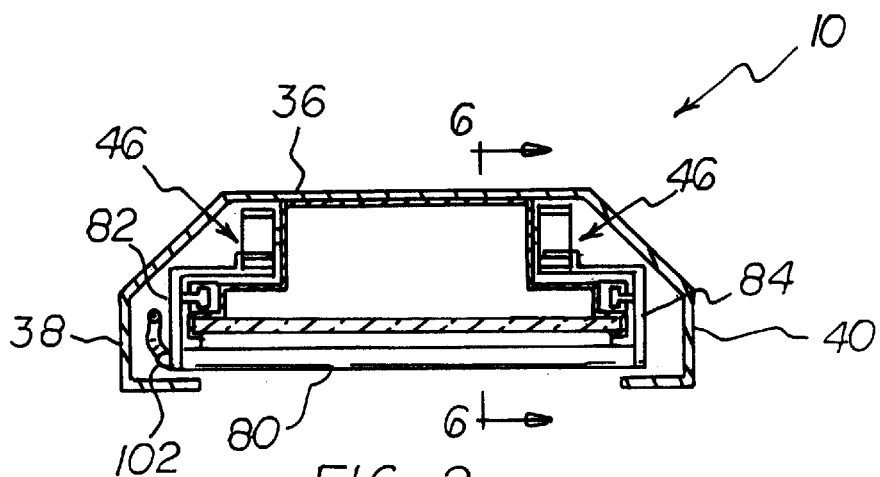
FIG. 2 is section view of the mirror cleaning system of the present invention taken along line 2—2 of FIG. 1.
Figure 3:
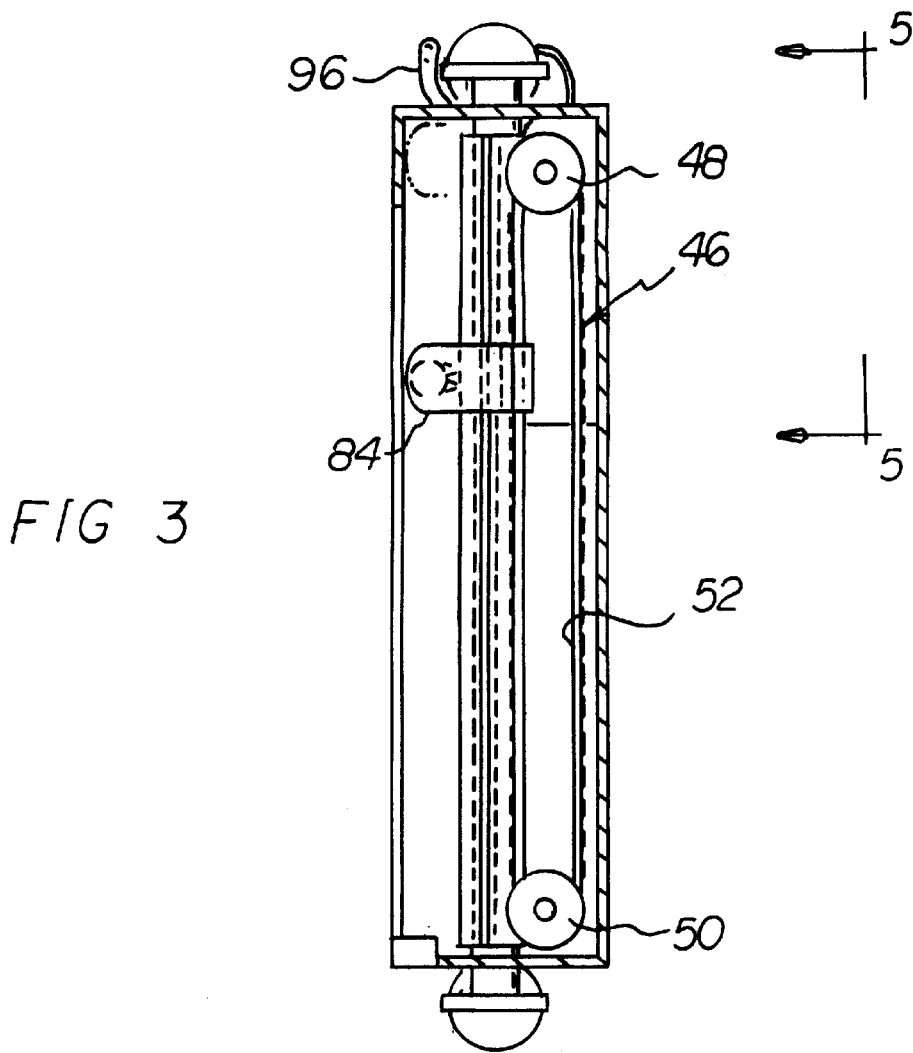
FIG. 3 is a section view of the mirror cleaning system of the present invention taken along line 3—3 of FIG. 1.
Figure 4:
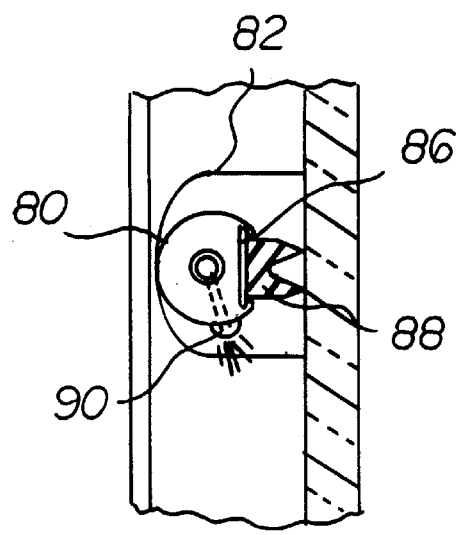
FIG. 4 is a section view of the mirror cleaning system taken along line 4—4 of FIG. 1.
Figure 5:
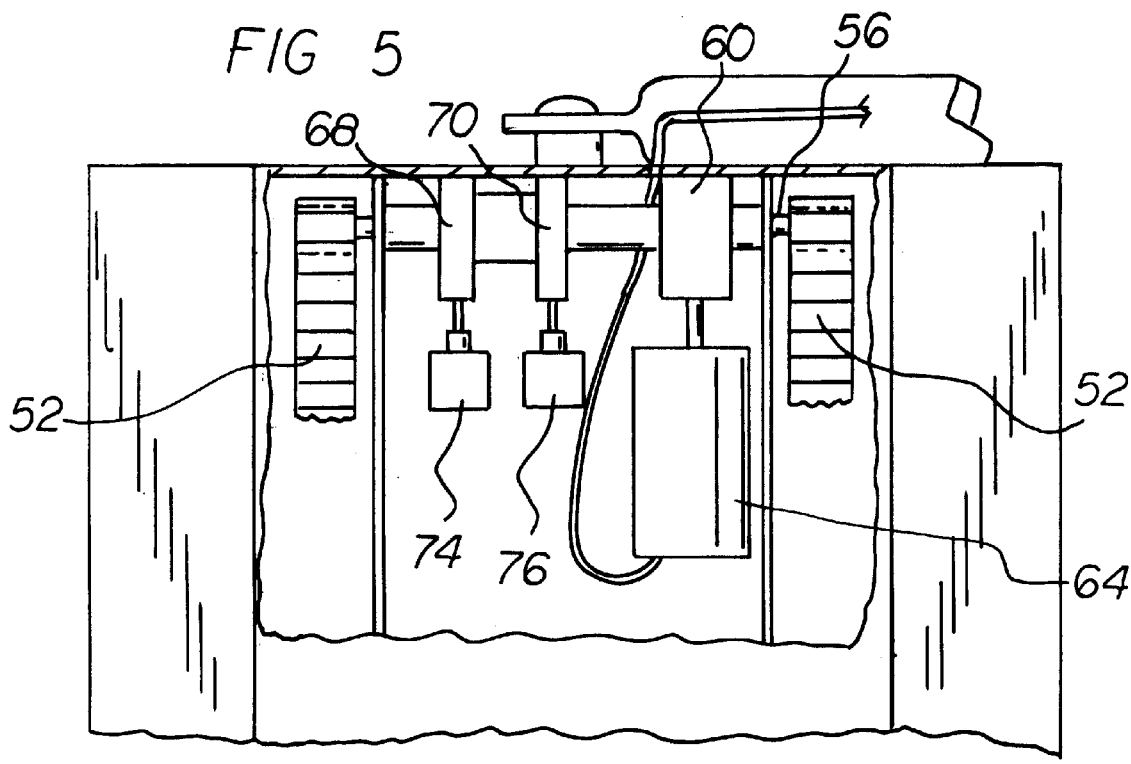
FIG. 5 is rear broken view of the mirror cleaning system showing the motor components.
Figure 6:
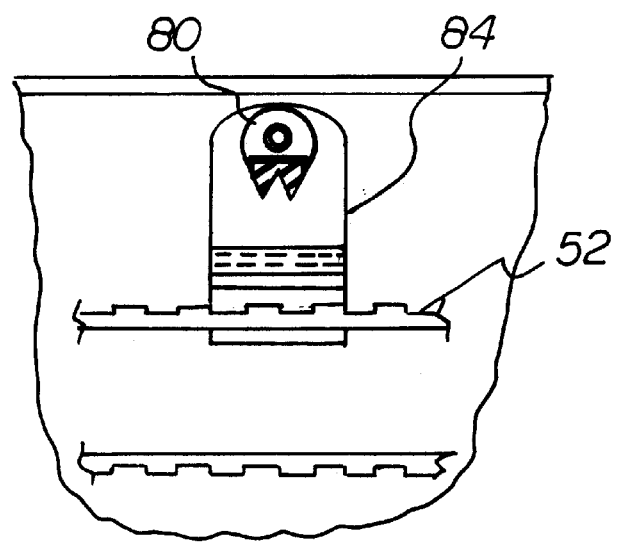
FIG. 6 is section view of the present invention taken along line 6—6 of FIG. 2.

With reference now to the drawings, and in particular to FIG. 1 thereof, the preferred embodiment of the new and improved mirror cleaning system embodying the principles and concepts of the present invention and generally designated by the reference numeral 10 will be described.

The present invention, the mirror cleaning system 10 is comprised of a plurality of components. Such components in their broadest context include a mirror, a drive assembly, a motor, a hollow cross piece, and length of hollow flexible tubing. Such components are individually configured and correlated with respect to each other so as to attain the desired objective.

A mirror 14 is first provided. The mirror has an exposed front surface 16 with a long vertically extending interior side edge 18 and a parallel exterior side edge 20. The mirror also has a short horizontally extending top edge 22 and a short horizontally extending bottom edge 24.

Next provided is a mirror support assembly 28. The mirror support assembly has a horizontally extending top plate 30 with an aperture 32 formed therein. The mirror support assembly also has a parallel bottom plate 34. A back plate 36 is coupled to the top plate and bottom plate to form an enclosure. The top and bottom plates support the mirror. A first side plate 38 and a second side plate 40 are provided. Brackets 42 are secured to the support assembly for coupling to a vehicle.

Further provided are a pair of drive assemblies 46 positioned on each side of the mirror within the support assembly. Each drive assembly has an upper pulley 48 fixedly positioned in proximity with the top plate of the support assembly and a lower pulley 50 fixedly positioned in proximity with the bottom plate of the support assembly. Each upper drive pulley is operatively coupled with an associated lower pulley with one of a pair of toothed belts 52 spanning the associated pulley.

A drive shaft 56 is next provided. The drive shaft couples the top pulleys of each drive assembly to effect concurrent rotation.

Further provided is a speed reducer 60. The speed reducer is supported adjacent one of the upper drive pulleys and coupled to the shaft adjacent one of the drive pulleys.

An electric motor 64 is provided. The electric motor is supported upon the back plate beneath the speed reducer and adapted to be coupled by a wire to a source of electricity.

Next provided is a pair of cam lobes 68, 70. The cam lobes are coupled to the shaft for rotation therewith and located adjacent the speed reducer.

Further provided is a pair of limit switches 74, 76. The limit switches are mounted to the back plate adjacent the cam lobes for periodic contact therewith as caused by the rotation of the cam lobes. The limit switches function to control the length and direction of travel of the cross piece.

A hollow cross piece 80 is provided. The hollow cross piece has an open end block 82 and a closed end block 84. The end blocks are each adapted to receive and ride upon one of the toothed belts. The cross piece has an axial recess 86 facing the mirror. The cross piece includes a supported double bladed elongated wiper arm 88 of an elastomeric material. The wiper arm is in sliding contact with the front surface of the mirror for cleaning purposes during reciprocation of the cross piece. The wiper arm is supported along its length by the recess. The cross piece has a pair of apertures 90, 92 spaced along the length thereof for spraying a cleaning fluid onto the surface of the mirror.

Finally, a length of hollow flexible tubing 96 is provided. The flexible tubing has a first end 98 adapted to be coupled to a source of pressurized cleaning fluid exterior of the mirror support assembly. The tubing has an intermediate extent 100 passing through the aperture in the top plate of the mirror assembly and formed in a loop within the first side plate of the support assembly. The tubing has a second end 102 coupled to the open end block of the cross piece adapted to deliver a supply of cleaning fluid to and through the cross piece onto the mirror.

When not in operation, the cross piece and wiper arm are at one end of the mirror, preferably the top, with no visual impairment so as not to encumber normal use of the mirror for maximum safety.

In an alternate embodiment of the invention, an aperture is formed in the bottom plate for the passage of the tubing there through. In this embodiment, the aperture in the top plate is eliminated.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A mirror cleaning system for washing and wiping side view mirrors of trucks and like vehicles comprising, in combination:

a mirror having an exposed front surface with a long vertically extending interior side edge and parallel exterior side edge with a short horizontally extending top edge and a short horizontally extending bottom edge;

a mirror support assembly having a horizontally extending top plate with an aperture formed therein and a parallel bottom plate with a back plate coupled thereto forming an enclosure, the top and bottom plates supporting the mirror and with a first side plate and a second side plate, and with brackets secured to the support assembly for coupling to a vehicle;

a pair of drive assemblies positioned on each side of the mirror within the support assembly, each drive assembly having an upper pulley fixedly positioned in proximity with the top plate of the support assembly and a lower pulley fixedly positioned in proximity with the bottom plate of the support assembly, each upper drive pulley operatively coupled with an associated lower pulley with one of a pair of toothed belts spanning the associated pulley;

a drive shaft coupling the top pulleys of each drive assembly to effect concurrent rotation;

a speed reducer supported adjacent one of the upper drive pulleys and coupled to the shaft adjacent one of the drive pulleys;

an electric motor coupled with said speed reducer supported upon the back plate beneath the speed reducer and adapted to be coupled by a wire to a source of electricity;

a pair of cam lobes coupled to the shaft for rotation therewith and located adjacent the speed reducer;

a pair of limit switches mounted to the back plate adjacent the cam lobes for periodic contacts therewith;

a hollow cross piece with an open end block and a closed end block, the end blocks each adapted to receive and ride upon one of the toothed belts, and with an axial recess facing the mirror, and including a supported double bladed elongated wiper arm of an elastomeric material in sliding contact with the front surface of the mirror for cleaning purposes during reciprocation of the cross piece, the wiper arm being supported along its length by the recess, the cross piece having a pair of apertures spaced along the length thereof for spraying a cleaning fluid onto the surface of the mirror; and a length of hollow flexible tubing having a first end adapted to be coupled to a source of pressurized cleaning fluid exterior of the mirror support assembly, an intermediate extent passing through the aperture in the top plate of the mirror assembly and formed in a loop within the first side plate of the support assembly, and a second end coupled to the open end block of the cross piece adapted to deliver a supply of cleaning fluid to and through the cross piece onto the mirror.

* * * * *